(12) United States Patent
Kim et al.

(10) Patent No.: US 7,442,021 B2
(45) Date of Patent: Oct. 28, 2008

(54) INJECTION MOLD HAVING SHEARING FLOW MAKING PART

(75) Inventors: Worl-yong Kim, Daejeon (KR);
Sun-woo Kim, Daejeon (KR); Eon-seok Lee, Daejeon (KR)

(73) Assignee: LG Chem, Ltd. (KR)

( * ) Notice: Subject to any disclaimer, the term of this patent is extended or adjusted under 35 U.S.C. 154(b) by 73 days.

(21) Appl. No.: 11/674,409

(22) Filed: Feb. 13, 2007

(65) Prior Publication Data
US 2007/0190203 A1  Aug. 16, 2007

(30) Foreign Application Priority Data
Feb. 13, 2006  (KR)  ................... 10-2006-0013694

(51) Int. Cl.
*B29C 45/16* (2006.01)
(52) U.S. Cl. ................... 425/127; 425/573; 425/577
(58) Field of Classification Search ......... 455/127–128, 455/573, 577, DIG. 10
See application file for complete search history.

(56) References Cited

U.S. PATENT DOCUMENTS 4,285,903 A * 8/1981 Lemelson ................... 425/435
6,648,622 B1 * 11/2003 Gellert et al. ............... 425/130
7,172,408 B2 * 2/2007 Wood et al. ................. 425/557

\* cited by examiner

*Primary Examiner*—Yogendra Gupta
*Assistant Examiner*—Thu Khanh T Nguyen
(74) *Attorney, Agent, or Firm*—Cantor Colburn LLP

(57) ABSTRACT

The present invention relates to an injection mold device having a shear flow making part. The device comprises an injection mold provided with a cavity in which molten resin mixed with predetermined pigments is filled, a shearing force making part installed in the injection mold, some portion thereof being exposed to the cavity to be in contact with the molten resin injected into the cavity and driven by external power to cause the molten resin in contact with the surface thereof to generate shear flow by a viscosity thereby adjusting locations of the pigments within the molten resin; and a driving part for driving the shearing force making part.

The injection mold device according to the present invention is capable of solving a problem due to poor orientation and lack of content of the pigments at a vicinity of the weldline thereby manufacturing a high quality product by generating a viscous flow in the molten resin located at a weldline generation area in an inside of an injection mold and thus adjusting location of the pigments mixed in the molten resin in the corresponding area.

7 Claims, 12 Drawing Sheets

49

49  50

INJECTION MOLD HAVING SHEARING FLOW MAKING PART

This application claims the benefit of the filing date of Korean Patent Application No. 10-2006-0013694 filed on Feb. 13, 2006 in the Korean Intellectual Property Office, the disclosure of which is incorporated herein in its entirety by reference.

TECHNICAL FIELD

The present invention relates to an injection mold device having a shear flow making part.

BACKGROUND ART

In order to add textures, e.g. a metallic, a pearl, a marble texture or so on, on a surface of a synthetic resin product, it is known a method in which resin material is mixed with a variety of pigments for expressing the textures previous to be injection molded. The method has advantages that compared to a method of adding spray coating or painting process to a conventional non-textural surface of a synthetic resin product, a manufacturing cost is much lower and there is no environmental trouble in relation to the coating or painting process.

Meanwhile, in the method of mixing molten resin with the pigments previous to injection mold, it is important that the pigments should be distributed evenly in a surface of a product after the injection molding. Particularly, flake type pigments should be oriented in parallel to a surface of a product. As such, only if the pigments are evenly distributed and properly oriented, the pigments contained in resin reflect evenly much amount of light and thus a product with brilliant feel and high quality can be obtained.

However, at a region R (i.e. a weldline) in FIG. 1 where at least two flows of the molten resin meet within a mold in an injection molding, a rear vicinity of a core (reference symbol 14 in FIG. 2) for forming a hollow in a product or so on, pigments within molten resin turn back from a core layer (reference symbol C in FIG. 3) to a skin layer (reference symbol S in FIG. 3) due to the fountain flow effect.

By this phenomenon, a low content area (reference symbol A in FIG. 3) in which a content of pigment is relatively low than other areas is generated at a vicinity of the weldline. Particularly in a case that the pigment is not a polyhedron type but a flake type, an orientation of the pigment (reference symbol 21 in FIGS. 3 and 6) is perpendicular to or slant to a surface of a product and thus an amount of reflected light is markedly decreased and the portion is looked like a dark line, which results in a defective product.

FIGS. 1 and 2 show schematically an injection molding of a product by a conventional injection mold. Although a structure of an injection mold varies as a shape of a product to be manufactured, a mold with the simplest structure is described as an example in order to help understanding.

Referring to FIG. 1, a core plate 15 and a cavity plate 13 are combined to form a single mold 11 and a cavity 17 which reflects a shape of a product to be manufactured is formed in an inside thereof. In addition, a gate 13a for injecting molten resin 19 is located at both side portions of the cavity plate 13. A location of the gate 13a is determined to a most appropriate position in view of various factors, such as flow property of the molten resin 19, flow length or so on, when designing the mold 11. In addition, a number of the gate 13a may also be varied in some cases.

However, two flows of the molten resin come to meet in a case that the mold has multiple gates even if the mold is very simple or by a structure of a product having a hole, difference in thickness or so on even in a case that the mold has a single gate, and there are many cases that two flows of the molten resin 19 which are generated by being injected through each of the gates or by a structure of a product meet frequently each other in the cavity 17. In example, as shown in FIG. 1, the molten resin 19 injected through the gate 13 a at both side meet at a center portion while moving to fill the cavity 17 in the z-direction.

The position at which the molten resin having different flows meet as described above is referred as a weldline R. Since unlike the other portions a flow of the resin is not smooth at a vicinity of the weldline, various phenomena which are not desirable are occurred which is likely to result in generation of a defect in product.

The problem resulted from the weldline is much significant in a case that the molten resin is mixed with pigments for expressing a texture to a product.

In addition, it is highly possible that the weldline is generated at a rear side of a core (reference symbol 14 in FIG. 2) in a case that the core 14 is provided in the cavity 17 of the mold 11 even if the resin is injected through the single gate 13a unlike the case shown in FIG. 1.

FIG. 2 shows the mold 11 provided with the core 14.

Referring to FIG. 2, it will be seen that the molten resin 19 injected into the cavity 17 through the single gate 13a flows viscously in a direction of an arrow P to fill gradually the cavity 17. The molten resin 19 is divided by the core 14 and then meets again at the rear side of the core 14. In other words, flow divided by the core 14 come to join again at the rear side of the core 14.

Such joining results in the same problem as that occurred when the two flows (which are flowed in through different gates) meet as described through FIG. 1. In other words, it results in the weldline R.

FIGS. 3, 4 and 5 are for explaining the problem of the conventional injection mold shown in FIG. 1.

FIG. 3 shows flow property of the pigments 21 at the vicinity of the weldline R in FIG. 1. The molten resin is primarily a viscous fluid, and when it flows inside a flow path a center portion thereof flows quickest and a portion adjacent to a wall flows slower as it approaches to the wall. Generally, a flow layer at a center portion is referred as a core layer C and a flow layer at an outer portion (i.e. between the core layer and wall) is referred as a skin layer S.

Anyway, referring to FIG. 3, the core layers C which meet together while flowing in z-direction in the cavity 17 of the mold collide with each other and then flow back in the opposite direction (while spreading out toward a circumference as a fountain). At this time, the cavity is in a state of being filled with the molten resin and thus there is no inflow of the molten resin. Therefore, the molten resin, which flows back in the opposite direction after colliding and then is located in the skin layer, is not able to move any more and then solidified at the place to become a product.

Meanwhile, the pigments 21 mixed in the molten resin move along the flow of the molten resin and then stop after being oriented in a pattern shown FIG. 3. Thus, a low content area A in which a content of the pigment is very low is generated at upper and lower portions of the weldline. The low content area A is a portion in which the content of the pigments 21 is very low than the other portion, and looks as dark as a light reflecting area is decreased and causes, particularly in a case that the pigment 21 is a flake type as shown, a result that the texture is not expressed at such portion of a product.

FIG. 4 is a sectional view showing a state that the molten resin 19 having the flows is solidified inside the mold. As shown, it will be seen that the low content area A is located at a vicinity of the weldline R. When opening the cavity plate 13 from the core plate 15 and taking an injection molded product B, it will be easily seen that a center portion of the product B, i.e. the low content area A at the vicinity of the weldline R looks darker than the other areas as shown in FIG. 5. Such product is classified as a defective.

FIG. 6 is a sectional view taken along line Q-Q in FIG. 2 for explaining the problem of the conventional injection mold shown in FIG. 2.

Referring to the drawing, it will be seen that the low content area A is located at a side portion of the mold 14. The low content area A is generated by the same cause as the description in relation to FIG. 3 and is expressed as the weldline R on a surface of the product.

DISCLOSURE OF THE INVENTION

It is an object of the present invention, to solve the above problems, to provide an injection mold device having a shear flow making part which is capable of manufacturing a high quality product by providing a shear flow making part, at a weldline generation area in an inside of an injection mold, for applying a searing force due to a viscosity to molten resin to adjust location of pigment mixed in the molten rein and thereby solving a problem due to poor orientation and lack of content of the pigments at a vicinity of the weldline.

To achieve the object of the invention, the present invention provides an injection mold device having a shear flow making part, comprising an injection mold provided with a cavity in which molten resin mixed with predetermined pigments is filled; a shearing force making part installed in the injection mold, some portion thereof being exposed to the cavity to be in contact with the molten resin injected into the cavity and driven by external power to cause the molten resin in contact with the surface thereof to generate shear flow by a viscosity thereby adjusting locations of the pigments within the resin; and a driving part for driving the shearing force making part.

Furthermore, the shearing force making part includes at least one roller or moving surface belt installed so that some portion of an outer surface thereof protruded in the cavity and causing the molten resin in contact with the outer surface to generate shear flow in a rotational direction through an axial rotation.

In addition, at least two rollers are arranged in parallel to each other and rotate in a same or different rotational direction according to a condition of the molten resin.

Furthermore, the mold is provided with a guiding groove extending in a longitudinal direction, and the shearing force making part includes a reciprocating member which is reciprocating in a state of being supported in the guiding groove and has a projecting portion for providing a shearing force to the molten resin while reciprocating.

Furthermore, the driving part may include a pivot link pin-connected to the reciprocating member and extending to an outside of the mold and an actuator for pivoting the pivot link so as to cause the pivot link to operate the reciprocating member.

Furthermore, the driving part may include a rack gear mounted on the reciprocating member, a pinion gear engaged with the rack gear and a motor for rotating the pinion gear.

In addition, the driving part may include a solenoid mounted at a portion of the reciprocating member and a plunger secured to the guiding groove in a state of being dependently movable and causing the reciprocating member to move forward or backward when the solenoid is operated.

BRIEF DESCRIPTION OF THE DRAWINGS

The above and other objects, features and advantages of the present invention will become apparent from the following description of preferred embodiments given in conjunction with the accompanying drawings, in which.

BEST MODES FOR CARRYING OUT THE INVENTION

Practical and presently preferred embodiments of the present invention are illustrative as shown in the following examples. A pigment mixed in molten resin is exemplary a flake type pigment in the present description; however it will be appreciated that besides the flake type a polyhedron type pigment or a different type of pigment may also be employed.

Figure 7:
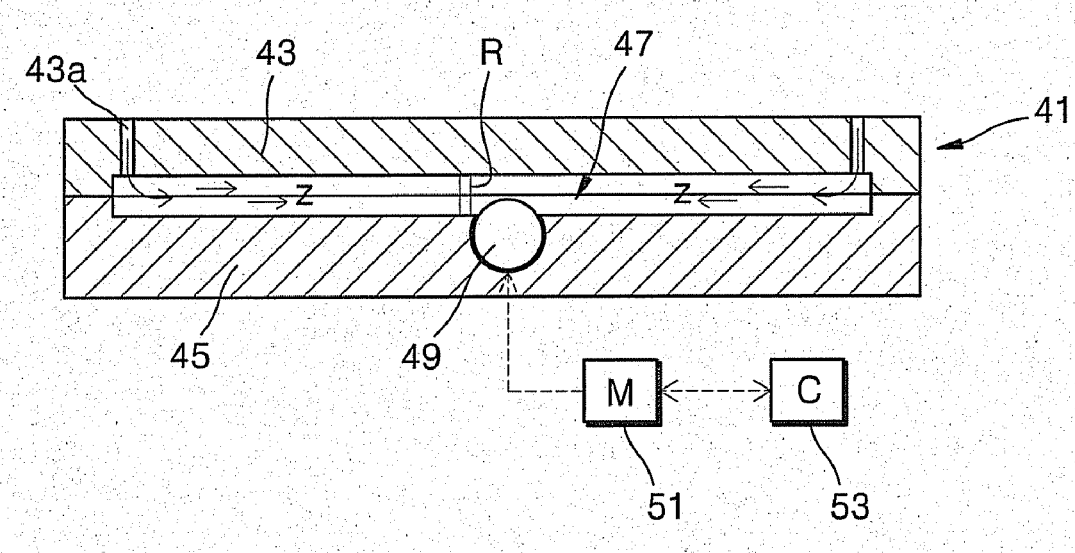
FIGS. 7 and 8 are structural views schematically illustrating a shear flow making part of a roller type according to a first embodiment and a moving surface belt type according to a second embodiment respectively in an injection mold device having the shear flow making part of the present invention.

FIG. 7 is a structural view schematically illustrating an injection mold device having a shear flow making part according to a first embodiment of the present invention.

Referring to the drawing, the injection mold device according to the first embodiment includes a mold 41 for manufacturing a plate shaped product (reference symbol B in FIG. 14), a roller 49 installed in an inside of the mold 41, and a driving part for driving the roller 49.

The mold 41 is constructed with a core plate 45 and a cavity plate 43 which is fitted on an upper portion of the core plate 45, and gates 43a for injecting molten resin into a cavity 47 of the mold are provided at both sides of the cavity plate 43. The gates 43a are located the most appropriate position considering a flow speed, flow length or so on of the molten resin.

Meanwhile, the roller 49 is a round rod type member which has a predetermined diameter and some portion of an outer peripheral surface of the roller is protruded to the cavity 47 of the mold 41, and receives power from a motor 51 provided at an outside portion of the mold 41 to rotate axially.

The roller 49 is arranged in a direction perpendicular to an inflow direction of molten resin which flows in the z-direction, and located at a position which is at a short distance from the weldline. For reference, the weldline is accurately predictable by a general numerical analysis. Though the roller 49 is at a short distance from the weldline R in the present embodiment, a center of the roller 49 may also be aligned with the weldline in some cases.

Figure 1:
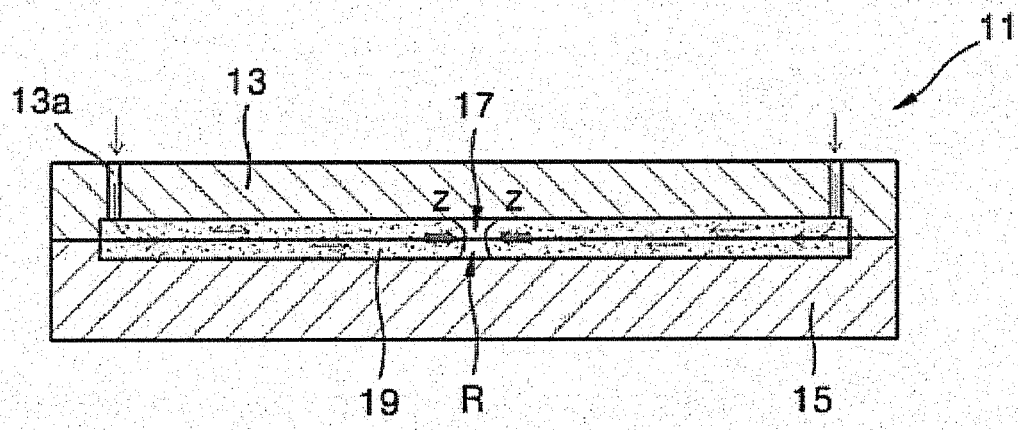
FIGS. 1 and 2 are schematic views showing an injection molding of a product using a conventional injection mold respectively.
Figure 2:
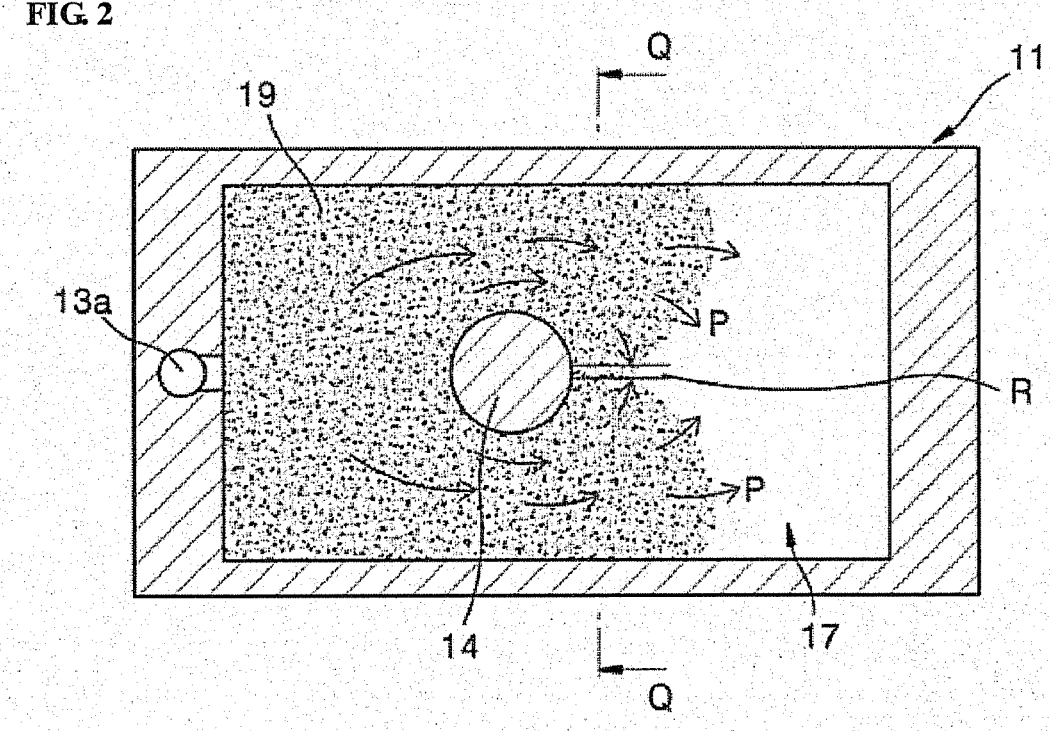
Figure 3:
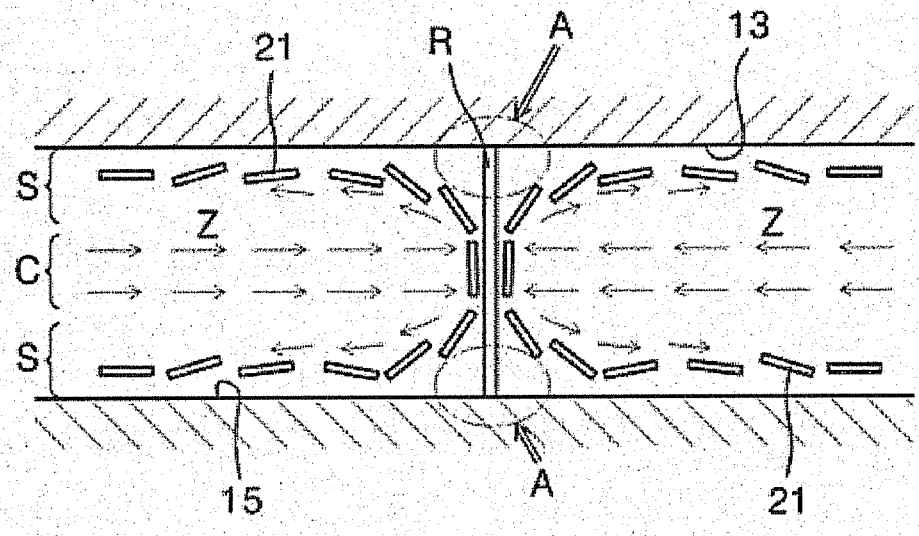
FIGS. 3, 4 and 5 are views for explaining a problem of the conventional injection mold shown in FIG. 1.
Figure 4:
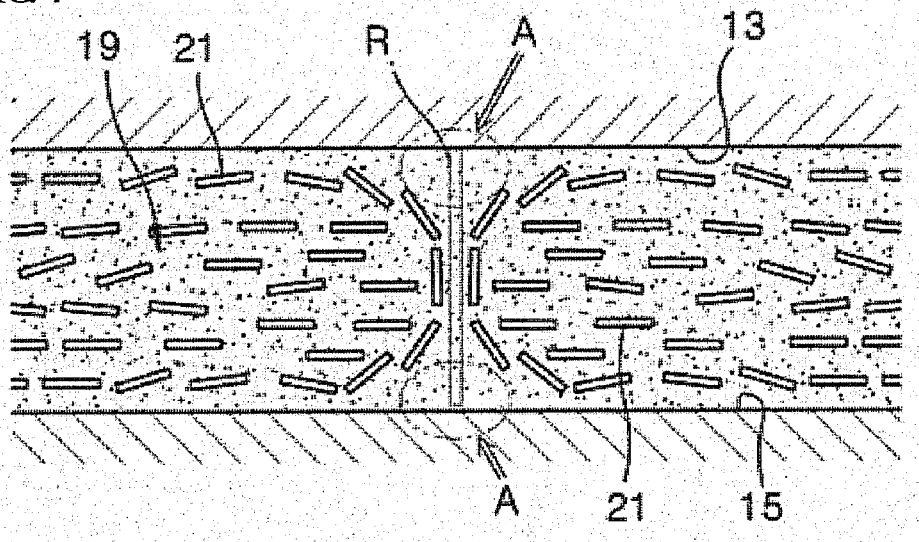
Figure 11:
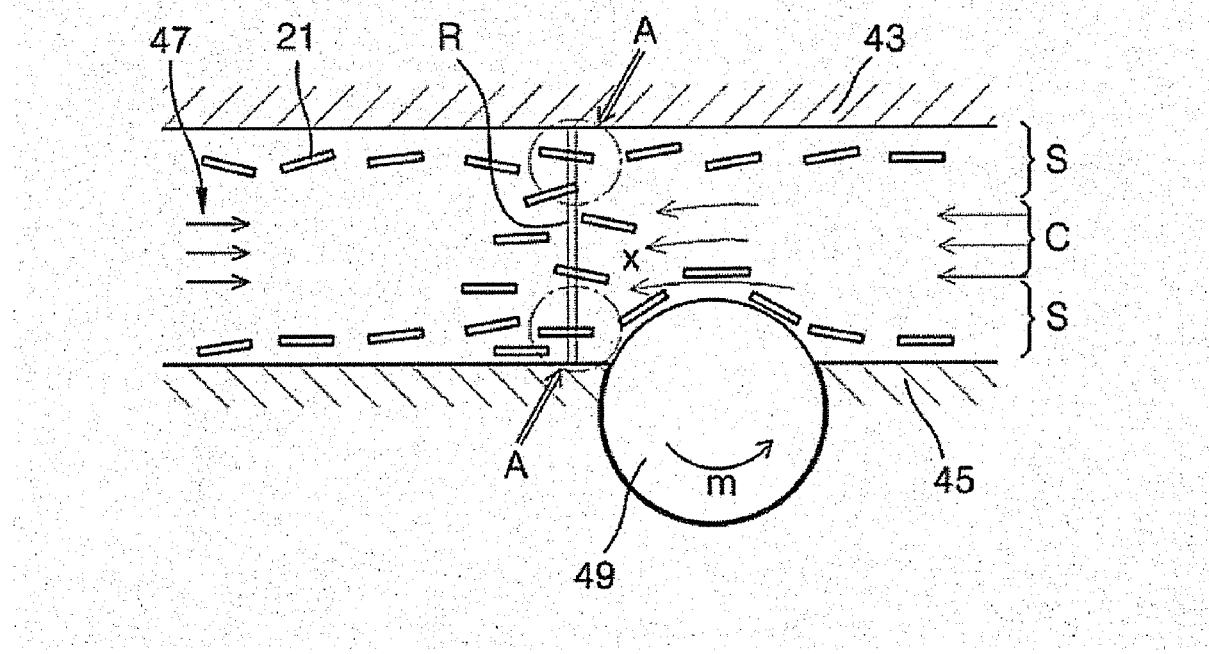
FIGS. 11, 12 and 13 are views for explaining an operation of the injection mold device shown in FIGS. 7 and 8.

Since the some portion of the outer peripheral surface of the roller 49 is protruded to the cavity 47, as shown in FIG. 11, the molten resin can be viscously flowed by the protruded outer peripheral surface in a direction of an arrow X in FIG. 11. Thus, the roller moves the pigment 21 contained in the molten resin to the low content area (reference symbol A in FIG. 4) and at the same time, particularly in a case that the pigment is a flake type pigment, leads the pigment to be oriented in substantially parallel to an inward facing surface of the mold.

The driving part for driving the roller 49 includes a motor 51 for transferring rotational torque to the roller 49 and a controller 53 for controlling the motor 51. The controller 53 is a conventional controlling means which is adjustable in a rotational speed or a rotational direction. Other driving means besides the motor may also be employed if it is capable of rotating the roller 49.

Figure 8:
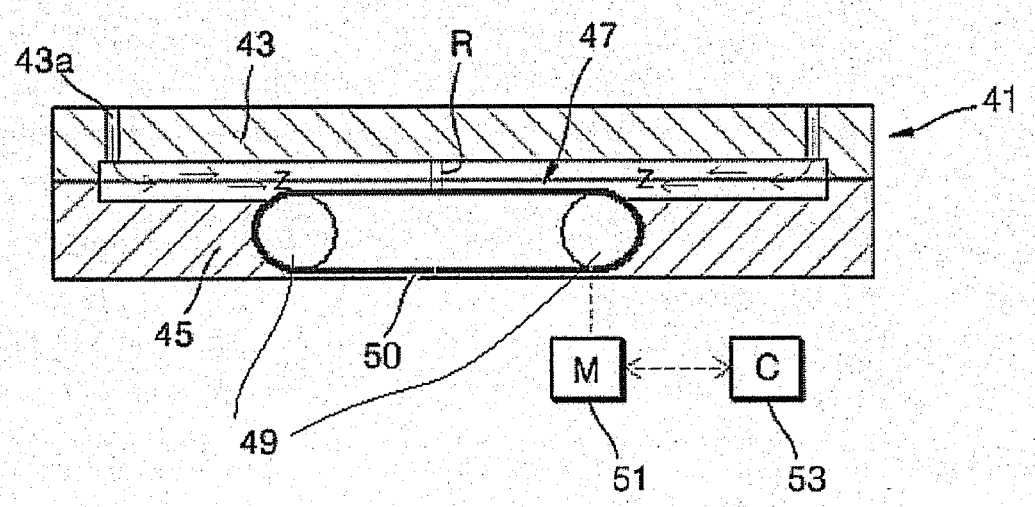

FIG. 8 is a structural view schematically illustrating an injection mold device having a shear flow making part according to a second embodiment of the present invention, and there is an advantage that an effect of shear flow can be maximized in comparison with a difficulty of manufacturing parts since a whole surface of a wide moving surface belt 50 instead of the roller in FIG. 7 is slightly protruded and moved.

Figure 9:
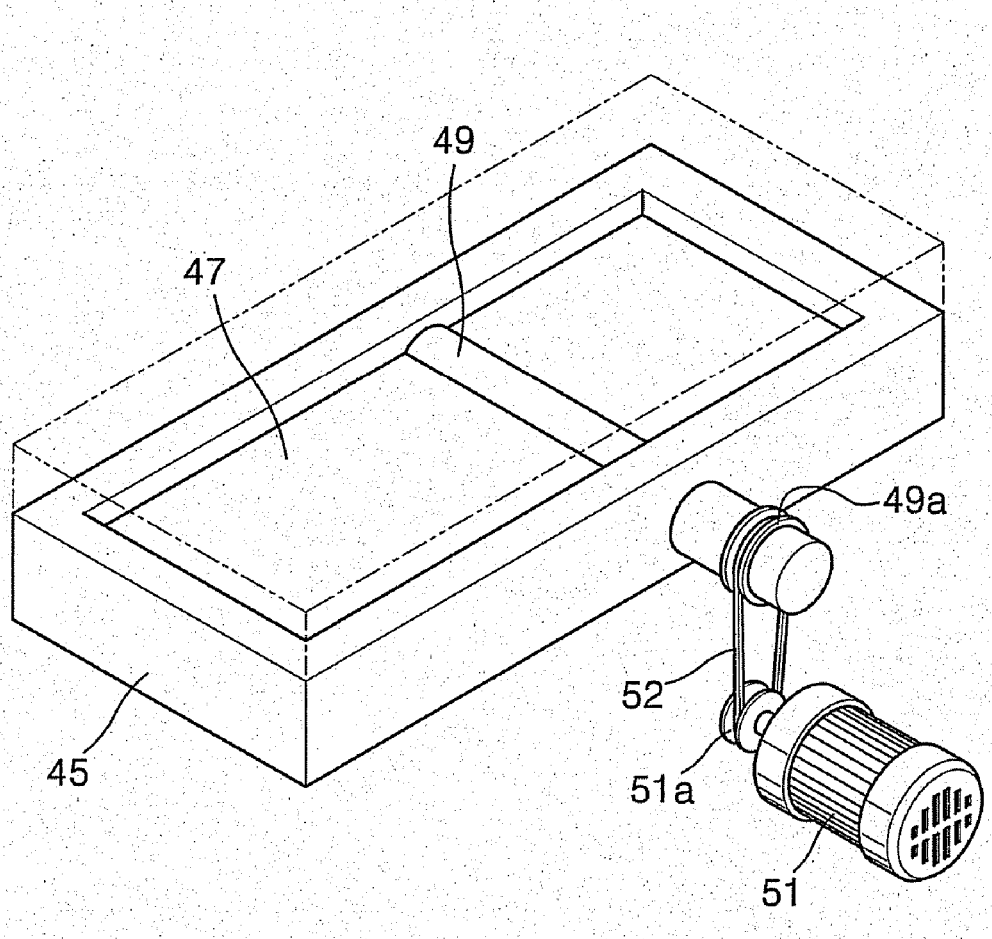
FIGS. 9 and 10 are partial perspective views illustrating the injection mold device shown in FIGS. 7 and 8.
Figure 10:
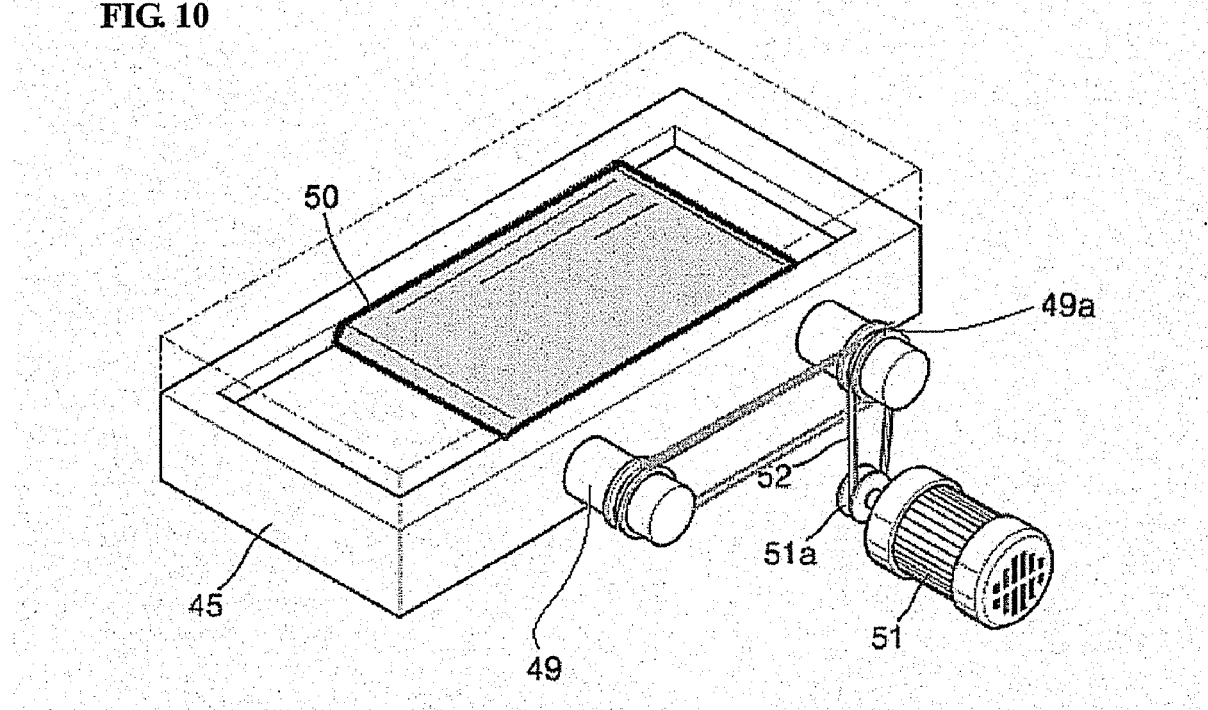

FIGS. 9 and 10 are partial perspective views illustrating the injection mold device shown in FIGS. 7 and 8, in which a power transmitting connection between the roller 49 and the motor 51 is exemplary illustrated.

As shown, the roller 49 is rotatively installed at the core plate 45. It is as same as the above description that the some portion of the outer peripheral surface of the roller 49 is protruded to the upper portion of the core plate 45.

Particularly, one end portion of the roller 49 extends to a side portion of the core plate 45 and a pulley 49a is secured to the extended end portion. The pulley 49a is connected by a belt 52 to a driving pulley 51a which is secured to a driving shaft of the motor 51. Thus, if the motor 51 is driven, rotational torque of the motor 51 is transmitted to the roller 49 through the belt 52.

Figure 12:
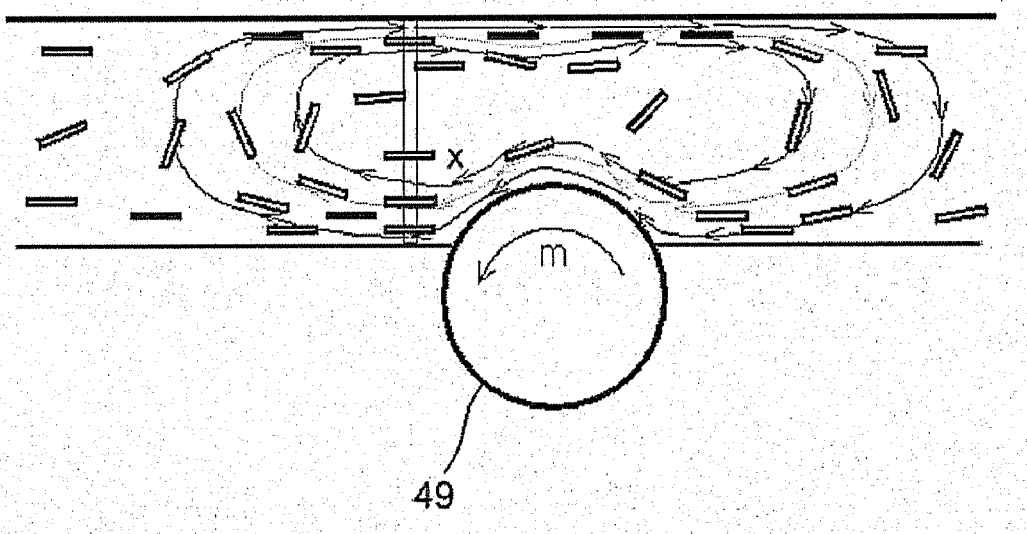
Figure 13:
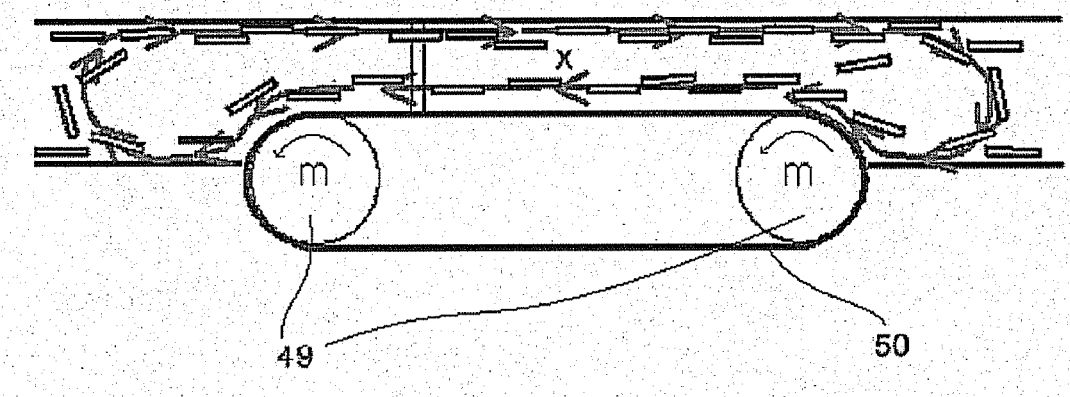

FIGS. 11, 12 and 13 are views for explaining an operation of the injection mold device shown in FIGS. 7 and 8, in which the molten resin flows viscously in the direction of an arrow X by rotation of the roller 49 in a state that the molten resin is already filled in the cavity 47 of the mold. The roller 49 is operated from when the molten resin comes to be filled in the cavity 47 to before the molten resin is solidified and specific operating time varies as a variety of condition or properties of the molten resin. Referring to the drawings, it will be seen that the pigment 21 located in the skin layer S of the pigments 21 within the molten resin (though pigment 21 alone is shown in the drawing, it is natural that the molten resin is filled in the cavity 47) is oriented in substantially parallel to inward facing surfaces of the cavity plate and core plate 43 and 45. Particularly, the pigment 21 is filled even in the low content area A of the weldline R in the same distribution density as other portions. This is resulted from the operation of the roller 49.

In other words, as the roller 49 is axially rotated in a direction of an arrow m, the molten resin in contact with the outer peripheral surface of the roller 49 flows viscously in the direction of the arrow X, and at this time the pigment 21 distributed within the molten resin is oriented in the flow direction and moved to the low content area A. The pigments in other areas except for the portion vicinity of the weldline are oriented in parallel to the inward facing surfaces of the cavity plate and core plates 43 and 45 and distributed in even density over all due to a property of the viscous flow.

Figure 14:
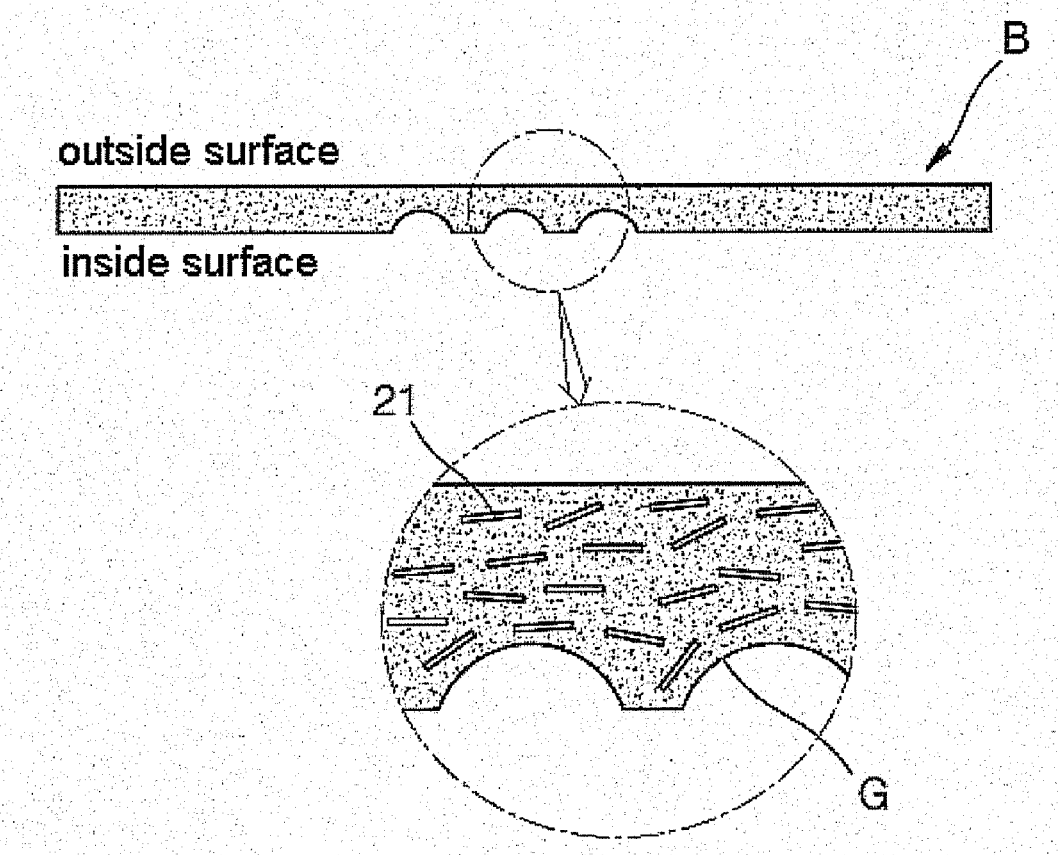
FIG. 14 is a sectional view illustrating a product manufactured by the injection mold device shown in FIG. 7.

FIG. 14 is a sectional view illustrating a product manufactured by the injection mold device shown in FIG. 7.

Figure 5:
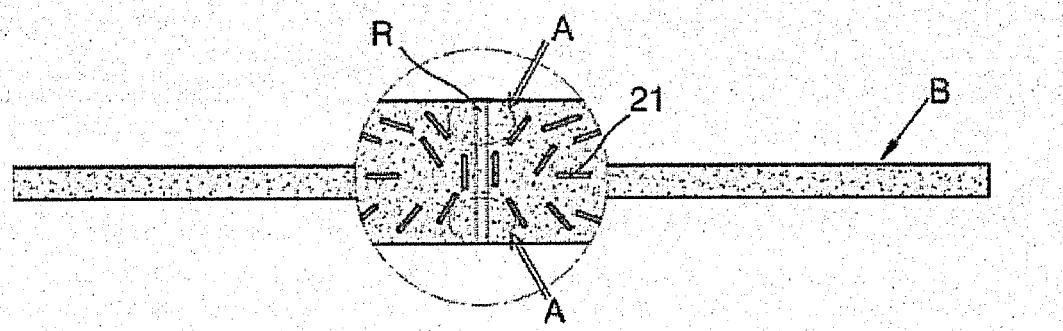
Figure 6:
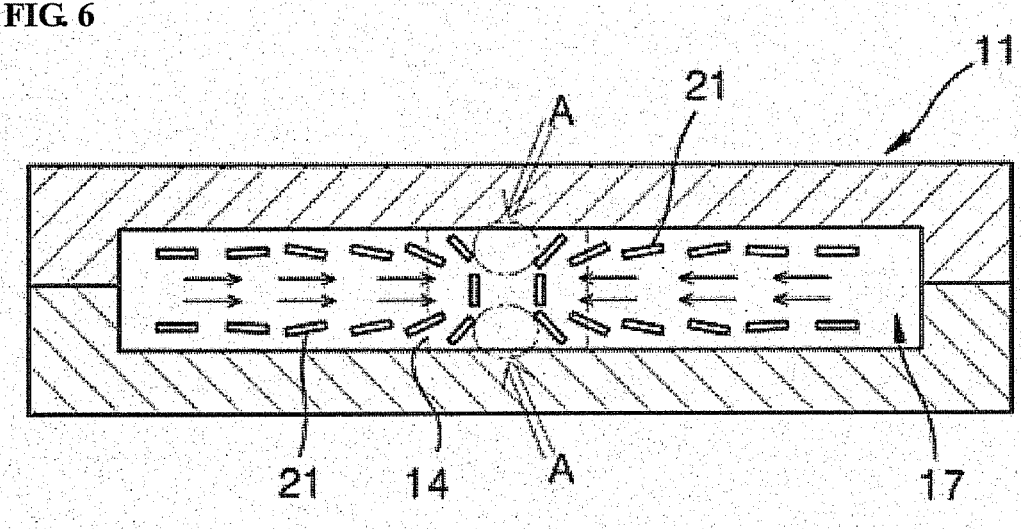
FIG. 6 is a sectional view taken along a line Q-Q in FIG. 2 for explaining a problem of the conventional injection mold shown in FIG. 2.

The product B in FIG. 14 can be obtained by separating the mold after solidifying the resin through cooling in a state that the pigment 21 is filled in the low content area A at a preferable orientation angle through a process of FIG. 5.

Referring to FIG. 14, it will be seen that the pigment 21 is distributed in even density over all in an inside of the product B. Particularly, there is no low content area which was the problem in the conventional art and the pigment adjacent to a surface of the product is oriented in substantially parallel to the surface. Thus, light incident to an outside surface of the product is reflected by each pigment 21 (without dark area) to display brilliant feel to outside.

Reference symbol G is a groove which is formed as the molten resin is solidified in a state that the roller 49 is inserted in. A surface at which the groove is placed is an inside surface which is not visible from outside.

Figure 15:
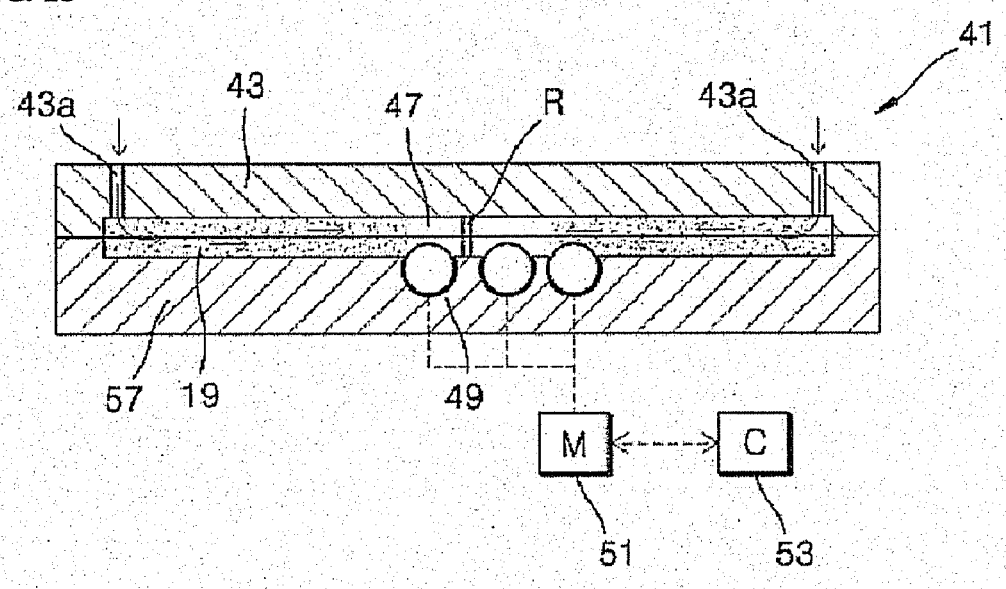
FIG. 15 is a schematic view illustrating a structure of an injection mold device using multiple rollers according to a third embodiment of the present invention.

FIG. 15 is a structural view schematically illustrating an injection mold device according to a third embodiment of the present invention. The injection mold devices according to the third embodiment and a forth embodiment which will be described later have the same principle as the first embodiment. In addition, same reference symbol as the reference symbol in the above description refers to the same member with the same function.

Referring to FIG. 15, the core plate 57 of the injection mold device according to the third embodiment is provided with multiple rollers 49. The four rollers 49 are rotated at a same rotational speed by the single motor 51. The rotational speed (a rotational direction is also included in the rotational speed) of the roller 49 is adjustable by the controller 53.

In addition, the power transmitting connection between each roller 49 and the motor 51 may be implemented by any conventional power coupling. Further, an operating time of the roller 49 is same as that in the first embodiment.

Figure 16:
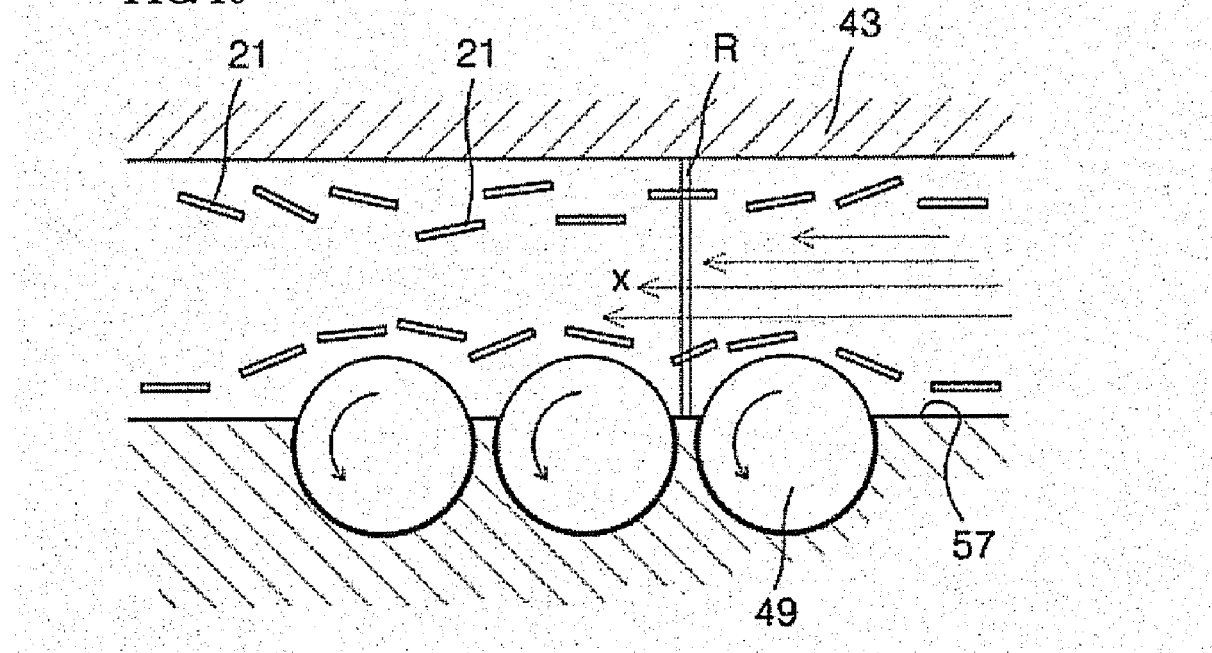
FIGS. 16 and 17 are views for explaining an operation of the injection mold device shown in FIGS. 15.
Figure 17:
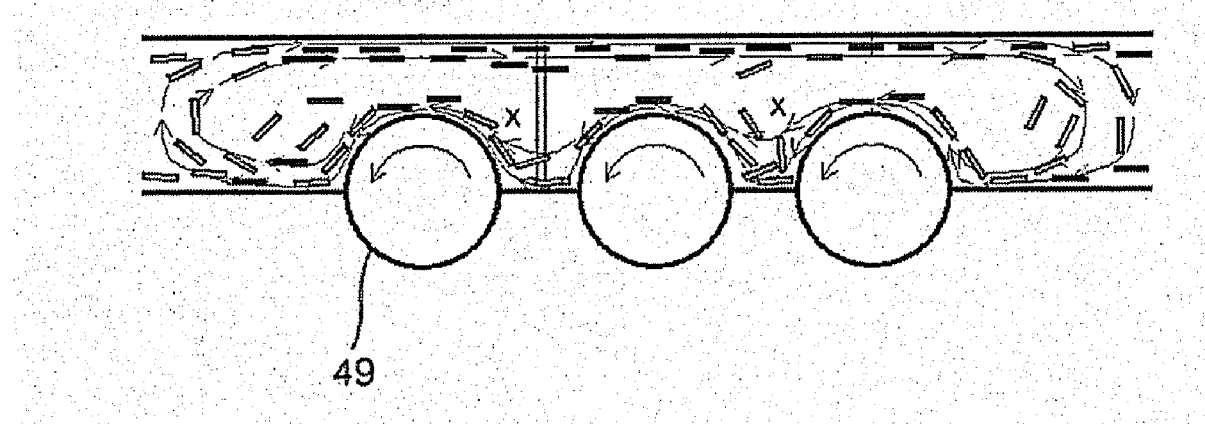

FIGS. 16 and 17 are views for explaining the operation of the injection mold device shown in FIG. 15.

As shown, the multiple rollers 49 are protruded from the inward facing surface of the core plate 57 to the upper portion. Each roller 49 makes the molten resin, which is filled in the cavity 47 and in contact with the outer peripheral surface of the roller, to flow viscously in the direction of the arrow X so that the pigment 21 within the molten resin is distributed in an even density and oriented in a desired direction. The function and operating mechanism of the roller 49 are same as those in the first embodiment.

In addition, in order to control flow of fluid to a desired direction according to a resin, forming condition, a mold such as a size of the pigment, a temperature of the resin, a temperature of the mold, viscosity of the resin, thickness of the resin layer, diameter and rotational speed of the roller and so on, the rollers 49 may be rotated in the same direction or different directions. In example, a rotational direction of the roller 49 in FIG. 16 and a rotational direction of the roller 49 in FIG. 17 are same but flow directions of the resin and the pigment in a portion of the cavity of the mold corresponding to an outer surface of the product are opposite to each other. This varies as a flow property of the fluid and a processing condition as shown in FIGS. 16 and 17.

Figure 18:
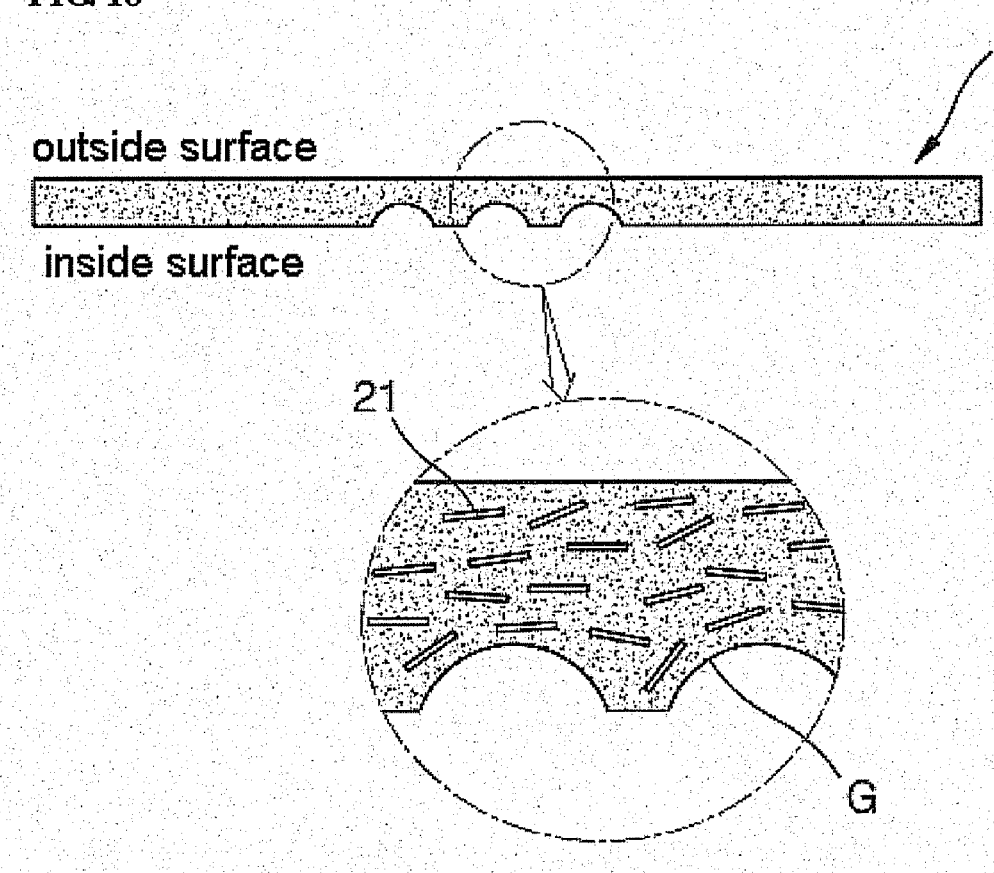
FIG. 18 is a sectional view illustrating a product manufactured by the injection mold device shown in FIG. 15.

FIG. 18 is a sectional view illustrating a product manufactured by the injection mold device shown in FIG. 15.

As shown, the pigments 21 are distributed evenly in an inside of the product B and particularly each pigment 21 is oriented in parallel to inside and outside surfaces of the product B. It is no wonder that the pigments are distributed evenly over all and result in no low content area and thus the weldline is not visible even if the pigment mixed in the product B is not a flake type but a polyhedron type.

Figure 19:
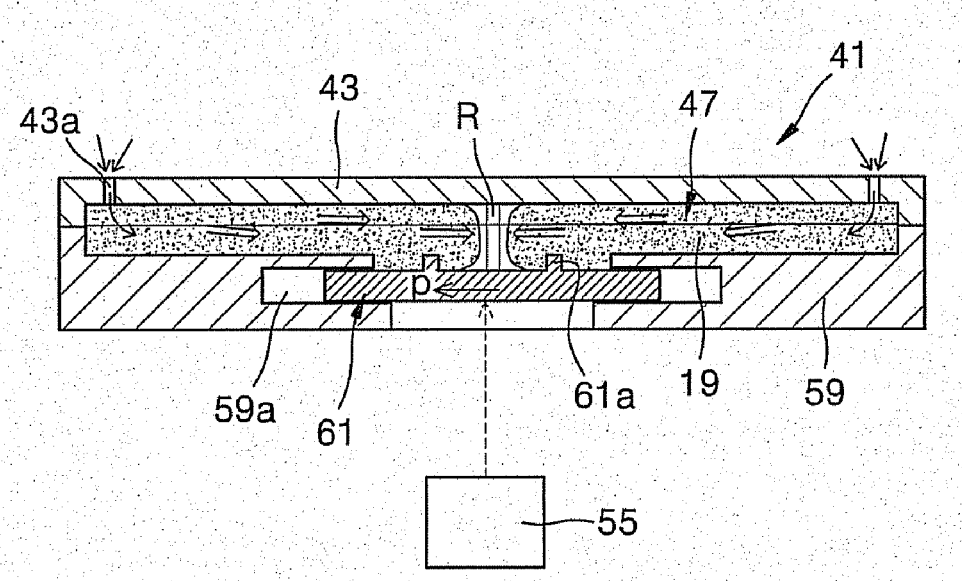
FIG. 19 is a schematic view illustrating a structure of an injection mold device according to a forth embodiment of the present invention.

FIG. 19 is a structural view schematically illustrating an injection mold device according to a forth embodiment of the present invention.

Referring to the drawing, a guiding groove 59a is formed at an inside of the core plate 59, and a reciprocating member 61 is supported at the guiding groove 59a so as to reciprocate on a straight line in the same or opposite directions of an arrow P. The reciprocating member 61 is a plate type member, in which both ends thereof are supportably inserted in the guiding groove 59a and the upper surface thereof is exposed to the cavity 47.

Multiple projecting portions 61a are formed on the upper surface of the reciprocating member. The projecting portion 61a is a linear protrusion extending in a direction perpendicular to a flow direction of the molten resin 19 which flows into the cavity 47 through the injecting port 43a, and makes the molten resin to flow viscously in a direction of an arrow X in FIG. 20 when the reciprocating member 61 moves in the direction of the arrow P.

Figure 22:
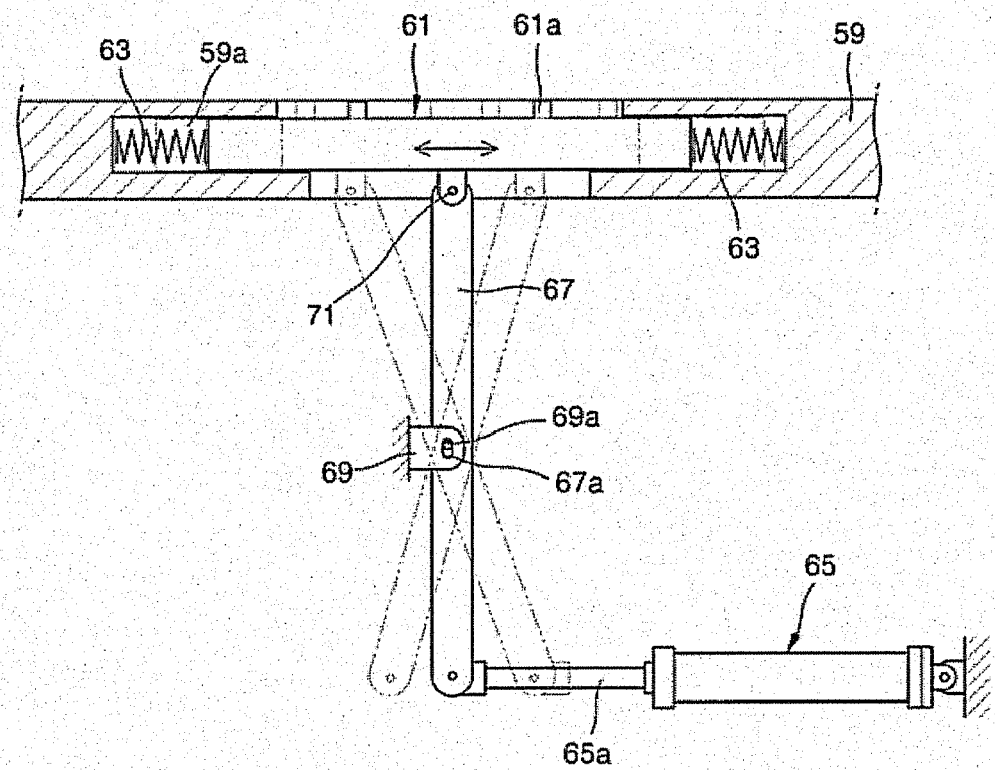
FIG. 22 is a schematic view illustrating an example of a driving part in the injection mold device shown in FIG. 19.
Figure 23:
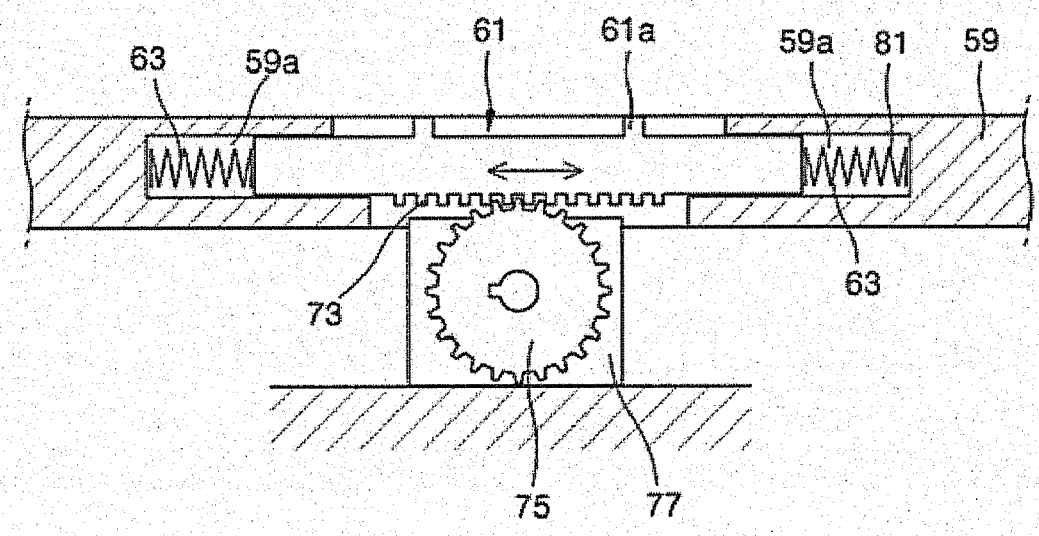
FIG. 23 is a schematic view illustrating another example of a driving part in the injection mold device shown in FIG. 19.
Figure 24:
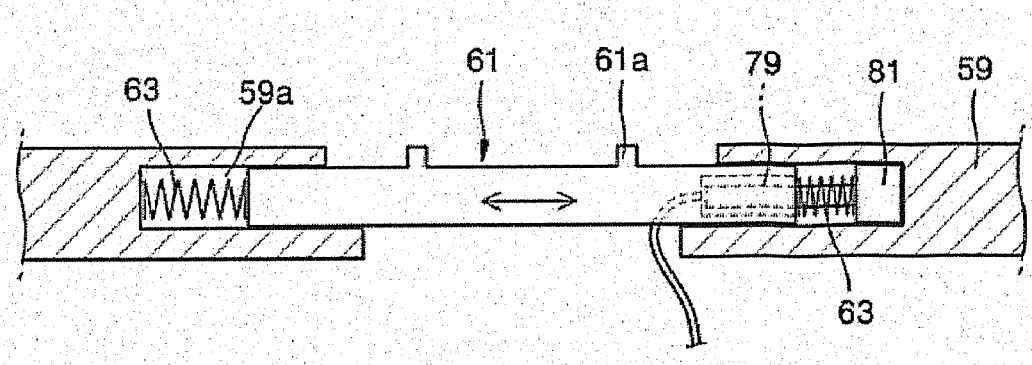
FIG. 24 is a schematic view illustrating yet another example of a driving part in the injection mold device shown in FIG. 19.

Reference symbol 55 denotes a driving part for driving the reciprocating member and a driving principle may vary in some cases and link, gear or solenoid types each shown in FIGS. 22, 23 and 24 may be employed.

Figure 20:
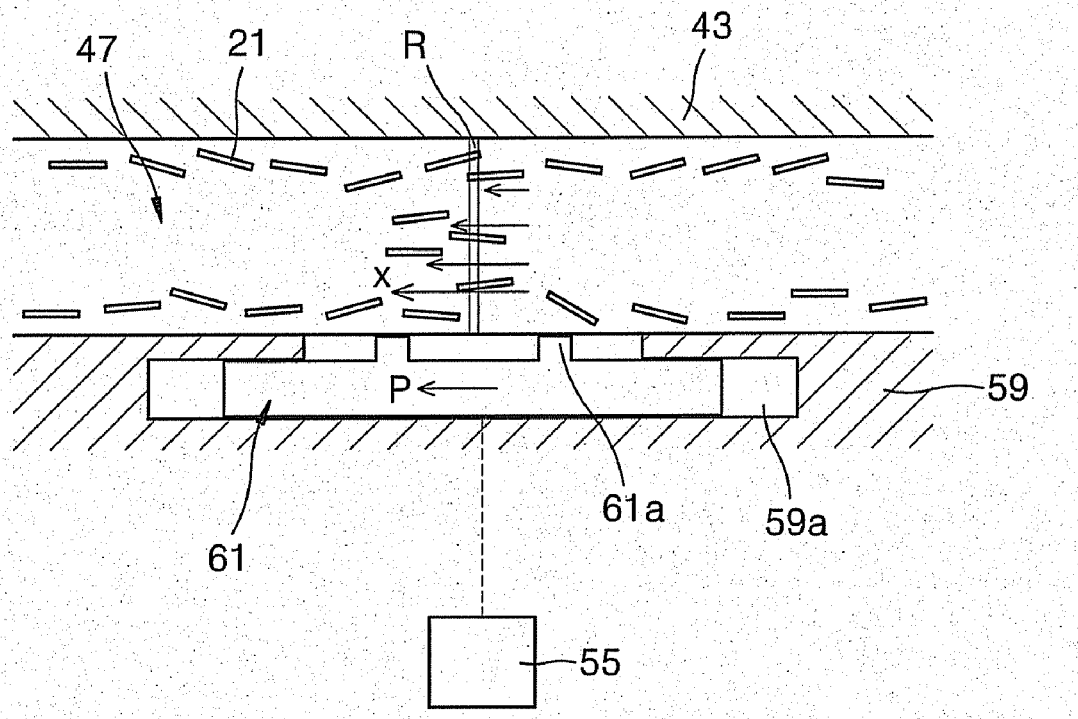
FIG. 20 is a view for explaining an operation of the injection mold device shown in FIGS. 19.

FIG. 20 is a view for explaining the operation of the injection mold device shown in FIG. 19.

As shown, some of the molten resin filled in the cavity 47 of the mold (only pigments 21 within the molten resin are shown in FIG. 20) is in contact with the upper surface of the reciprocating member 61. In this state, if the reciprocating member 61 is instantly moved in the direction of the arrow P by the driving part 55, the protrusion portion 61a causes a viscous flow in the direction of the arrow X within the molten resin and moves the inhomogeneous pigments 21 within the molten resin which flowed in through different ways to come into contact to the low content area (the low content area is always generated until the roller 49 or the reciprocating member 61 is operated).

Anyway, the pigments 21 can be distributed evenly and oriented in a desired direction by operating repeatedly the reciprocating member 61 to generate sufficient viscous flow. The orientation of the pigment is not important in a case that a polyhedron pigment is used.

Figure 21:
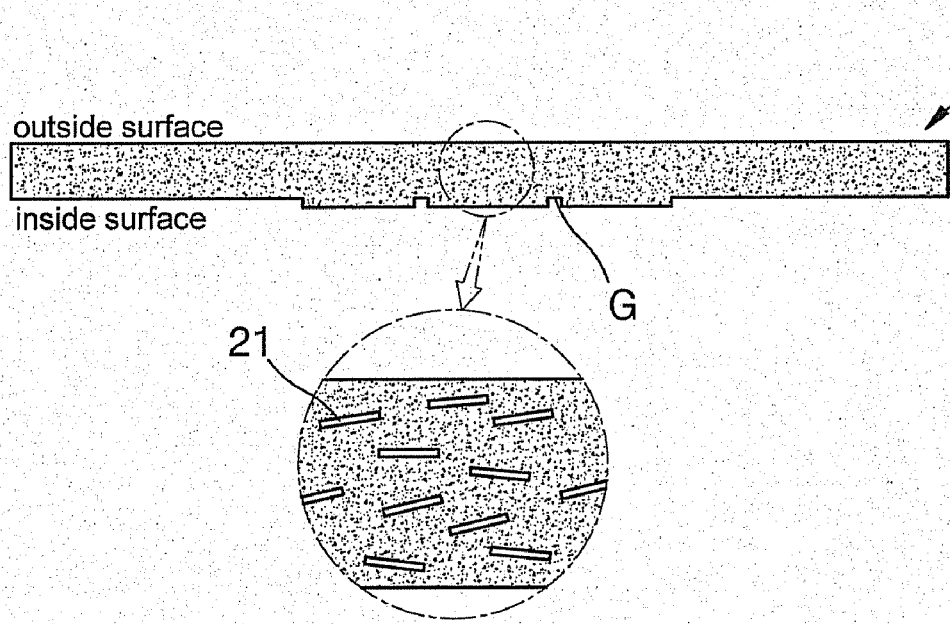
FIG. 21 is a sectional view illustrating a product manufactured by the injection mold device shown in FIG. 19.

FIG. 21 is a sectional view illustrating a product manufactured by the injection mold device shown in FIG. 19.

Referring to the drawing, it will be seen that the pigments 21 are distributed evenly in an inside of the product B without the low content area.

FIG. 22 is a schematic view illustrating an example of a driving part 55 in the injection mold device shown in FIG. 19.

As shown, a pivot link 67 is pin-connected to a lower surface of the reciprocating member 61 through a connecting hinge 71. The pivot link 67 is a rod with a predetermined length which extends to an outside of the core plate 59 in a state of being connected to the reciprocating member 61 and has a center portion pin-connected to a fixing hinge 69 by a pin 69a.

In order to connect the pivot link 67 to the fixing hinge 69, an elongated slot 67a is provided ay a corresponding portion of the pivot link 67 and the pin 69a of the fixing hinge 69 is inserted in the slot 67a. As such, the pivot link 67 is freely pivoted in a stated of being fixed to the fixing hinge 69 by forming the slot 67a in the pivot link 67.

An actuator 65 is connected to a lower end portion of the pivot link 67. The actuator 65 is a pneumatic or hydraulic actuator and an actuating rod 65a thereof is pin-connected to a lower end portion of the pivot link 67. Thus, the reciprocating member 61 is reciprocated in a left-right direction in a state of being supported in the guiding groove when the actuator 65 is operated to reciprocate the actuating rod 65a. A reference symbol 63 is a buffer spring.

FIG. 23 is a schematic view illustrating another example of a driving part in the injection mold device shown in FIG. 19.

Referring to the drawing, it will be seen that a rack gear 73 is provided at a lower surface of the reciprocating member 61 and a pinion gear 73 is engaged with the rack gear 73. The pinion gear 75 is secured to a driving shaft of the motor 77 and transmits a rotational torque of the motor to the rack gear 73 so that the reciprocating member 61 reciprocates in a state of supported in the guiding groove 59a. Buffer springs 63 are provided at both end portions of the reciprocating ember 61.

FIG. 24 is a schematic view illustrating yet another example of a driving part in the injection mold device shown in FIG. 19.

As shown, a solenoid part 79 is provided at an inside end portion of the reciprocating part 61 and a plunger 81 is correspondingly installed in the solenoid part 79. The plunger 81 is a member which moves toward or away from the reciprocating member 61 by an induced electromagnetic force generated when the solenoid part 79 is applied with electricity. An operating principle of the solenoid is well known in the art.

However, the plunger 81 is secured at an inner end portion of the guiding groove 59a. Thus, not the plunger 61 but the reciprocating member 61 moves toward or away from the plunger 61, i.e. reciprocates in direction of the arrow when the solenoid part 79 is applied with electricity As such, the reciprocating member 61 may be operated by electricity as a driving source.

INDUSTRIAL APPLICABILITY

As explained hereinbefore, the injection mold device having a shear flow making part according to the present invention is capable of solving a problem due to poor orientation and lack of content of the pigments at a vicinity of the weldline thereby manufacturing a high quality product by generating a viscous flow in the molten resin located at a weldline generation area in an inside of an injection mold and thus adjusting location of the pigments mixed in the molten resin in the corresponding area.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. An injection mold device having a shear flow making part comprising:
    an injection mold provided with a cavity in which molten resin mixed with predetermined pigments is filled;
    a shearing force making part installed in the injection mold, some portion thereof being exposed to the cavity to be in contact with the molten resin injected into the cavity and driven by external power to cause the molten resin in contact with the surface thereof to generate shear flow by a viscosity thereby adjusting locations of the pigments within the molten resin; and
    a driving part for driving the shearing force making part.

2. The injection mold device having a shear flow making part as set forth in claim 1, wherein the shearing force making part includes at least one roller or moving surface belt installed so that some portion of an outer surface thereof protruded in the cavity and causing the molten resin in contact with the outer surface to generate shear flow in a rotational direction through an axial rotation.

3. The injection mold device having a shear flow making part as set forth in claim 2, wherein at least two rollers are arranged in parallel to each other and rotate in a same or different rotational direction according to a condition of the molten resin.

4. The injection mold device having a shear flow making part as set forth in claim 1, wherein the mold is provided with a guiding groove extending in a longitudinal direction, and the shearing force making part includes a reciprocating member which is reciprocating in a state of being supported in the guiding groove and has a projecting portion for providing a shearing force to the molten resin while reciprocating.

5. The injection mold device having a shear flow making part as set forth in claim 4, wherein the driving part includes a pivot link pin-connected to the reciprocating member and extending to an outside of the mold and an actuator for pivoting the pivot link so as to cause the pivot link to operate the reciprocating member.

6. The injection mold device having a shear flow making part as set forth in claim 4, wherein the driving part includes a rack gear mounted on the reciprocating member, a pinion gear engaged with the rack gear and a motor for rotating the pinion gear.

7. The injection mold device having a shear flow making part as set forth in claim 4, wherein the driving part includes a solenoid mounted at a portion of the reciprocating member and a plunger secured to the guiding groove in a state of being dependently movable and causing the reciprocating member to move forward or backward when the solenoid is operated.

* * * * *